(12) United States Patent
Vaishampayan et al.

(10) Patent No.: US 8,949,518 B2
(45) Date of Patent: *Feb. 3, 2015

(54) METHOD FOR TRACKING MEMORY USAGES OF A DATA PROCESSING SYSTEM

(71) Applicant: Apple Inc., Cupertino, CA (US)

(72) Inventors: Umesh S. Vaishampayan, Santa Clara, CA (US); Daniel A. Chimene, San Francisco, CA (US); Daniel S. Heller, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/095,035

(22) Filed: Dec. 3, 2013

(65) Prior Publication Data

US 2014/0089627 A1    Mar. 27, 2014

Related U.S. Application Data

(63) Continuation of application No. 13/300,144, filed on Nov. 18, 2011, now Pat. No. 8,626,993.

(51) Int. Cl.
*G06F 12/02* (2006.01)
*G06F 11/07* (2006.01)
*G06F 11/34* (2006.01)

(52) U.S. Cl.
CPC .......... *G06F 12/0292* (2013.01); *G06F 11/073* (2013.01); *G06F 11/076* (2013.01); *G06F 11/079* (2013.01); *G06F 12/0253* (2013.01); *G06F 11/3466* (2013.01)
USPC ...................................................... 711/103

(58) Field of Classification Search
None
See application file for complete search history.

(56) References Cited

U.S. PATENT DOCUMENTS

| | | |
|---|---|---|
| 6,658,652 B1 | 12/2003 | Alexander |
| 7,246,139 B2 | 7/2007 | Andoh |
| 2002/0163913 A1 | 11/2002 | Oh |
| 2003/0002194 A1 | 1/2003 | Andoh |
| 2004/0123038 A1 | 6/2004 | Shami |
| 2007/0226445 A1 | 9/2007 | Nichols |
| 2008/0162793 A1 | 7/2008 | Chu et al. |
| 2010/0153352 A1 | 6/2010 | Hahn |
| 2011/0205897 A1 | 8/2011 | Pritam |

FOREIGN PATENT DOCUMENTS

| | | |
|---|---|---|
| JP | 3735484 | 3/1997 |
| JP | H0962565 | 3/1997 |
| JP | 2000293400 | 10/2000 |
| JP | 09244948 | 10/2009 |

OTHER PUBLICATIONS

International Search Report and Written Opinion in Application No. PCT/US2012/056902, issued Dec. 10, 2012, pp. 1-10.
Notice of Allowance from Korean Application No. 10-2012-108937, mailed Dec. 23, 2013, Korean version, pp. 1-2.
International Preliminary Report on Patentability from PCT/US2012/056902, mailed May 30, 2014, Apple Inc., pp. 1-8.
Notice of Allowance for Taiwanese Application No. 101136089, issued Aug. 26, 2014, English version, pp. 1-5.

*Primary Examiner* — Duc Doan
(74) *Attorney, Agent, or Firm* — Meyertons, Hood, Kivlin, Kowert & Goetzel, P.C.

(57) ABSTRACT

Techniques for tracking memory usages of a data processing system are described herein. According to one embodiment, a memory manager is to perform a first lookup operation in a memory allocation table to identify an allocation entry based on a handle representing a memory address of a memory block allocated to a client and to retrieve a trace entry pointer from the allocation entry. The memory manager is then to perform a second lookup operation in a memory trace table to identify a trace entry based on the trace entry pointer and to increment a memory allocation count of the trace entry. The memory allocation count is utilized to indicate a likelihood of the client causing a memory leak.

20 Claims, 8 Drawing Sheets

```
Allocate (size)
{
    pointer = allocate_memory (size);
    owner_backtrace = get_backtrace();
    trace_table [owner_backtrace].allocation_count ++;
    allocation_table [hash(pointer)] = &trace_table [owner_backtrace];
    return handle;
}
```

FIG. 5

```
Free (pointer)
{
    trace_entry_pointer = allocation_table [pointer];
    trace_entry_pointer -> allocation_count --;
    deallocate_entry (allocation_table (pointer));
}
```

FIG. 6

METHOD FOR TRACKING MEMORY USAGES OF A DATA PROCESSING SYSTEM

CROSS REFERENCE TO RELATED APPLICATION

This patent application claims priority to U.S. patent application Ser. No. 13/300,144, filed Nov. 18, 2011, which is herein incorporated by reference in its entirety.

FIELD OF THE INVENTION

Embodiments of the present invention relate generally to data processing systems. More particularly, embodiments of the invention relate to a mechanism to track memory usages of a data processing system.

BACKGROUND

A data processing system uses an operating system (OS) to manage the hardware and software resources of the computer. The OS is a software program that performs basic tasks, such as controlling and allocating memory, prioritizing the processing of instructions, controlling input and output devices, facilitating networking, and managing files. The OS also provides application program interfaces (APIs) to enable the application programs to interact with the hardware and software resources as well as with other application programs.

As more and more services are becoming available for data processing systems, the number of programs running in a system has increased significantly. Each of these programs typically consumes a certain amount of resources such as memory. Some of the programs may cause memory leaks. For example, a program may allocate a block of memory and fail to properly release the memory block once it is done. Overtime, the available memory to be allocated to other programs becomes less and less. Although the density of memory devices continues to increase, memory capacities are still very limited.

Usually, a system monitors memory usage by multiple running applications to ensure availability of a required capacity of free memory. In some systems, when memory usage reaches a critical level, the system takes memory management actions to increase the size of free memory, such as activating a garbage collection procedure to obtain allocated memories from applications which are no longer running. The system may also target a selected application, such as by simply killing the application. In some situations, it is useful or important to identify who causes the memory leaks in order to further improve the overall system. Typically, it is difficult to identify the cause of memory leaks within a single multipurpose program such as an operating system kernel. However, there has been a lack of an efficient mechanism to track or pinpoint the offenders that cause the memory leaks.

BRIEF DESCRIPTION OF THE DRAWINGS

Embodiments of the invention are illustrated by way of example and not limitation in the figures of the accompanying drawings in which like references indicate similar elements.

FIG. 5 is pseudocode representing a program implementing a process of memory allocation according to one embodiment of the invention.

FIG. 6 is pseudocode representing a program implementing a process of memory deallocation according to one embodiment of the invention.

DETAILED DESCRIPTION

Figure 1:
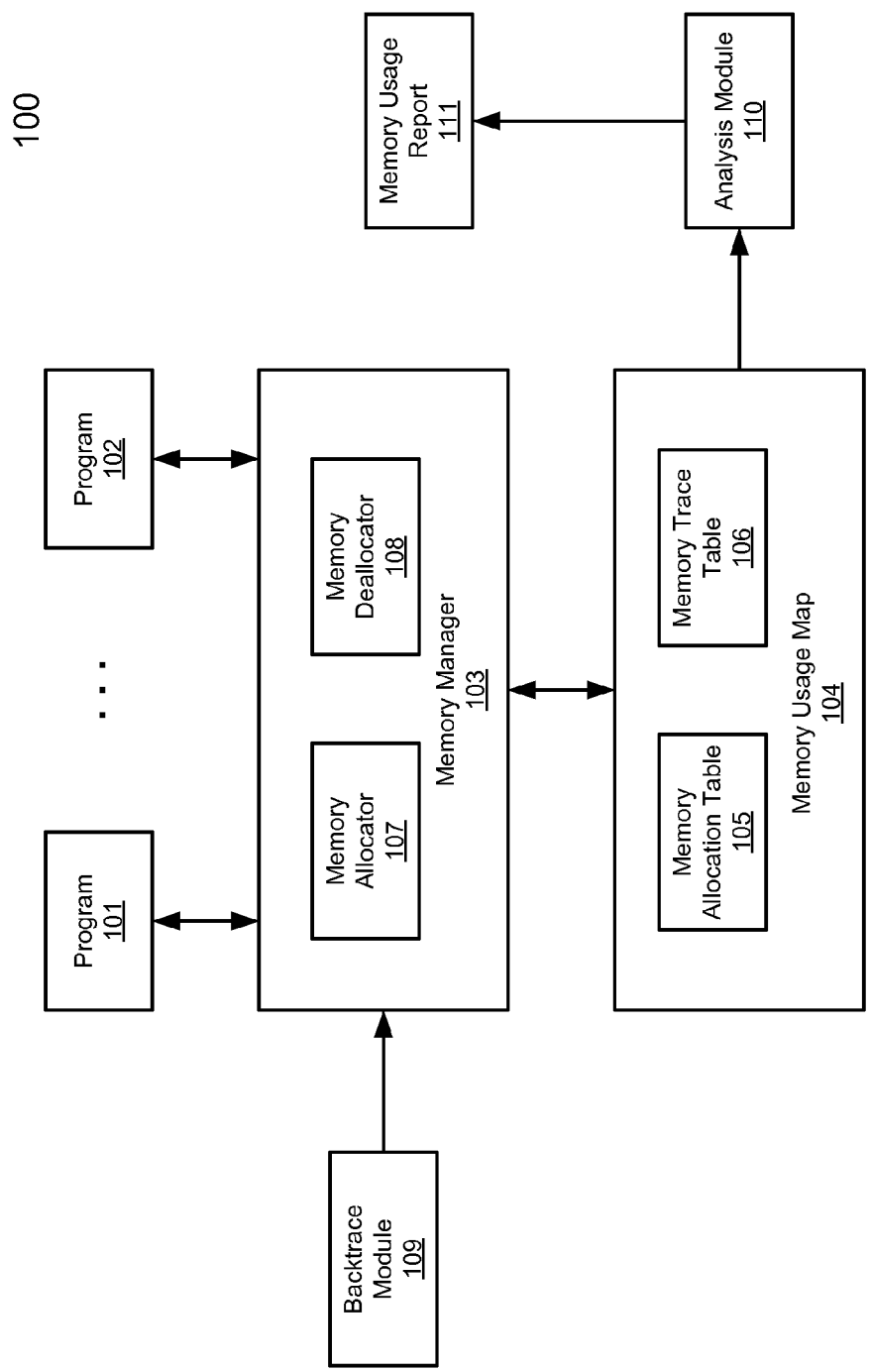
FIG. 1 is a block diagram illustrating a system for tracking memory usages according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a memory manager of an operating system is configured to maintain a memory allocation table (also simply referred to as an allocation table) and a memory trace table (also simply referred to as a trace table) to keep track of memory allocation and deallocation of clients or owners that request the memory allocation. In one embodiment, the allocation table includes multiple entries, where each entry is indexed based on a memory address of an allocated block of memory. Each entry includes a pointer referencing to an entry of the trace table. The trace table includes multiple entries, where each entry is indexed by an identifier of a client or owner that requested the memory allocation.

When a memory block is allocated to a client and referenced by a handle representing a memory address of the allocated memory block, a memory manager is configured to look up an allocation entry of the allocation table based on the handle to determine whether a pointer to the trace table has been stored therein. If the pointer exists, a trace entry of the trace table is accessed based on the pointer retrieved from the allocation table and the memory allocation information of the trace entry is updated. In one embodiment, a memory allocation count of the trace entry may be incremented in response to a memory allocation request and the memory allocation count may be decremented in response to a memory deallocation request. The memory allocation count may be used to indicate the likelihood that a client may request allocation of a memory block and does not properly deallocate the same (e.g., memory leak).

In one embodiment, a client or owner of an allocated memory block may be represented by a backtrace of sequence of executable code or stack frames of a program that requested the memory allocation and/or deallocation. In a complicated multipurpose program, a backtrace is useful to more accurately identify a specific subset of the program's activities. Each of the entries in the allocation table is indexed based on a hash value of a handle of a memory allocation. Each of the entries in the trace table is indexed based on a hash value of a backtrace of a program that requested a memory allocation and/or memory deallocation. As a result, the memory manager can pinpoint based on the backtraces and their memory allocation counts which line or lines of executable code likely cause the memory leaks in an efficient way.

FIG. 1 is a block diagram illustrating a system for tracking memory usages according to one embodiment of the invention. System 100 as shown in FIG. 1 may represent a variety of data processing systems or devices. For example, system 100 may present a client machine such as a desktop, laptop, a tablet, a mobile phone (e.g., Smartphone), a media player, or a combination thereof. Alternatively, system 100 may represent a server such as a Web server, an application server, or a backend server. Referring to FIG. 1, system 100 includes one or more programs 101-102 communicatively coupled to memory manager 103 via an API. Memory manager 103 may be implemented as a part of an operating system, which may be a variety of operating systems such as the Mac OS™ or iOS™ available from Apple® Inc. of Cupertino, Calif., the Windows™ operating system from Microsoft® Corporation of Redmond, Wash., a Unix® or Linux® operating system. Programs 101-102 and/or memory manager 103 may be running at a user level and/or at a kernel level of the operating system. For example, any of programs 101-102 may be running at a user level (e.g., applications) or at a kernel level (e.g., device driver) of an operating system.

In one embodiment, memory manager 103 is configured to maintain memory usage map 104 having memory allocation table 105 and memory trace table 106. Memory usage map 104 is configured to record memory usages such as memory allocations and/or deallocations by programs running within system 100 such as programs 101-102. Memory usage map 104 may be maintained by the operating system in the system memory such as a random access memory (RAM) of system 100.

Figure 2:
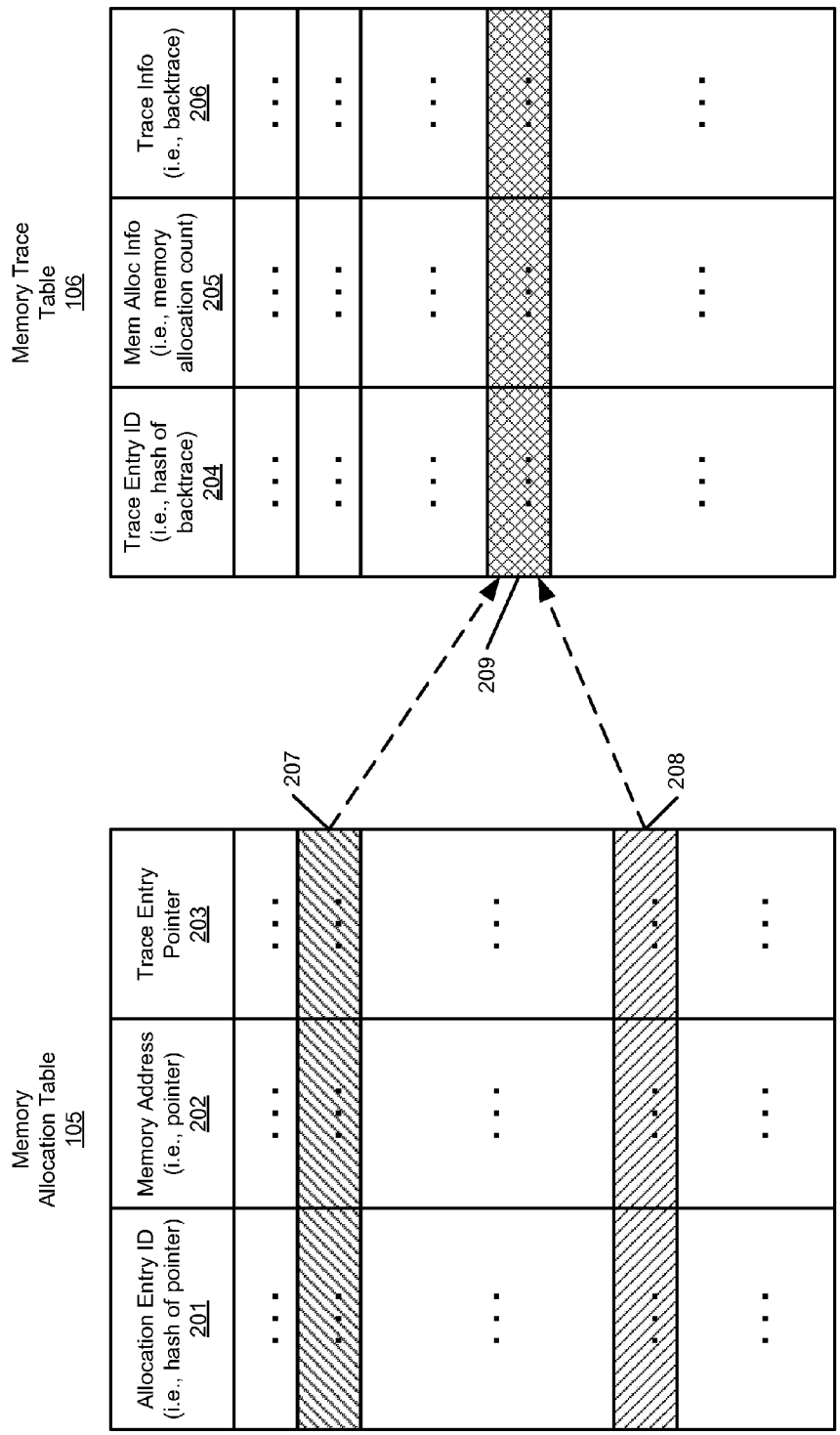
FIG. 2 is a block diagram illustrating an example of an allocation table and a trace table according to one embodiment of the invention.

According to one embodiment, allocation table 105 and trace table 106 of memory usage map 104 are utilized to keep track of memory allocation and deallocation by clients or owners. An example of allocation table 105 and trace table 106 is shown in FIG. 2 for the purpose of illustration. In one embodiment, referring to FIG. 2, allocation table 105 includes multiple entries, where each entry is indexed based on a memory address 201 of an allocated block of memory. Each entry includes a pointer 203 referencing to an entry of trace table 106. Each entry of allocation table 105 may also include other optional information such as the actual memory address 202. Trace table 106 includes multiple entries, where each entry is indexed by an identifier of a client or owner 204 that requested the memory allocation. Each trace entry of trace table 106 further includes memory allocation information 205 such as a memory allocation count and optionally other information such as the actual backtrace 206. Note that allocation table 105 and trace table 106 as shown in FIG. 2 are described for illustration purposes only; other formats may also be utilized and more or less information may be included therein.

Referring back to FIGS. 1 and 2, when a memory block is allocated to a client and referenced by a handle representing a memory address of the allocated memory block, memory allocator 107 is configured to look up an allocation entry (e.g., allocation entry 207) of allocation table 105 based on the handle (e.g., field 201 of allocation entry 207) to determine whether a pointer or link to trace table 106 has been stored therein (e.g., field 203 of allocation entry 207). If the pointer exists, a trace entry (e.g., trace entry 209) of trace table 106 is accessed based on the pointer retrieved from allocation table 105 (e.g., field 204 of trace entry 209) and the memory allocation information of the trace entry (e.g., field 205 of trace entry 209) is updated. In one embodiment, the memory allocation information includes a memory allocation count of the trace entry, which may be incremented in response to a memory allocation request.

Figure 8:
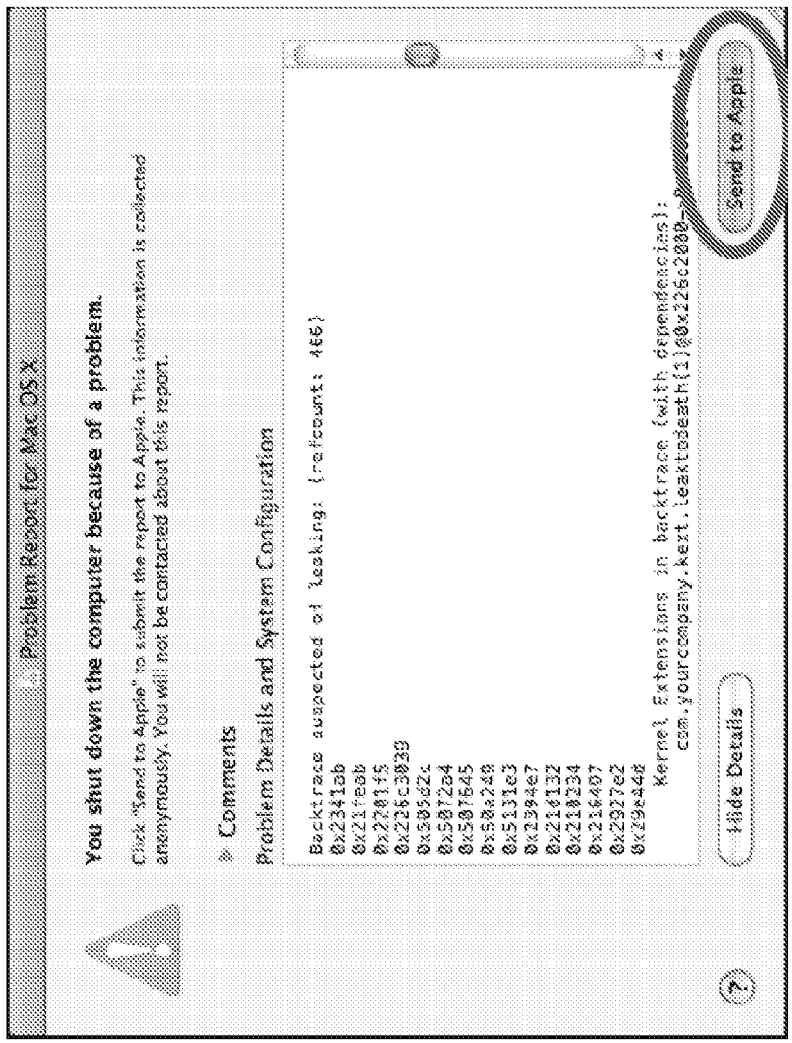
FIG. 8 is a screenshot illustrating a graphical user interface which may be used with an embodiment of the invention.

According to one embodiment, when a request to deallocate a memory block referenced by a handle is received, memory deallocator 108 is configured to look up an allocation entry (e.g., allocation entry 208) of allocation table 105 based on the handle (e.g., field 201 of allocation entry 208) and to retrieve a pointer (e.g., field 203 of allocation entry 208) referencing to a trace entry (e.g., trace entry 209) of trace table 106. Memory deallocator 108 is then to update the memory deallocation information (e.g., field 205 of trace entry 209), for example, decrementing the memory allocation count of the trace entry. The memory allocation count may be used to indicate the likelihood that a client may request allocation of a memory block and does not properly deallocate the same when it is done (e.g., memory leak). In this embodiment, a positive memory allocation count may indicate that a program may allocate more memory blocks than the ones deallocated over a period of time. A program with a higher memory allocation count may be considered as a top or leading memory leak suspect. In one embodiment, memory manager 103 may maintain information concerning a list of one or more top memory leak suspects, for example, based on their respective memory allocation counts, for analysis and/or reporting purposes. For example, as shown in FIG. 8, a user can obtain the backtrace information of one or more top memory leak suspects based on the information from allocation table 105 and trace table 106 and send the information to other facilities for analysis purposes.

Figure 3:
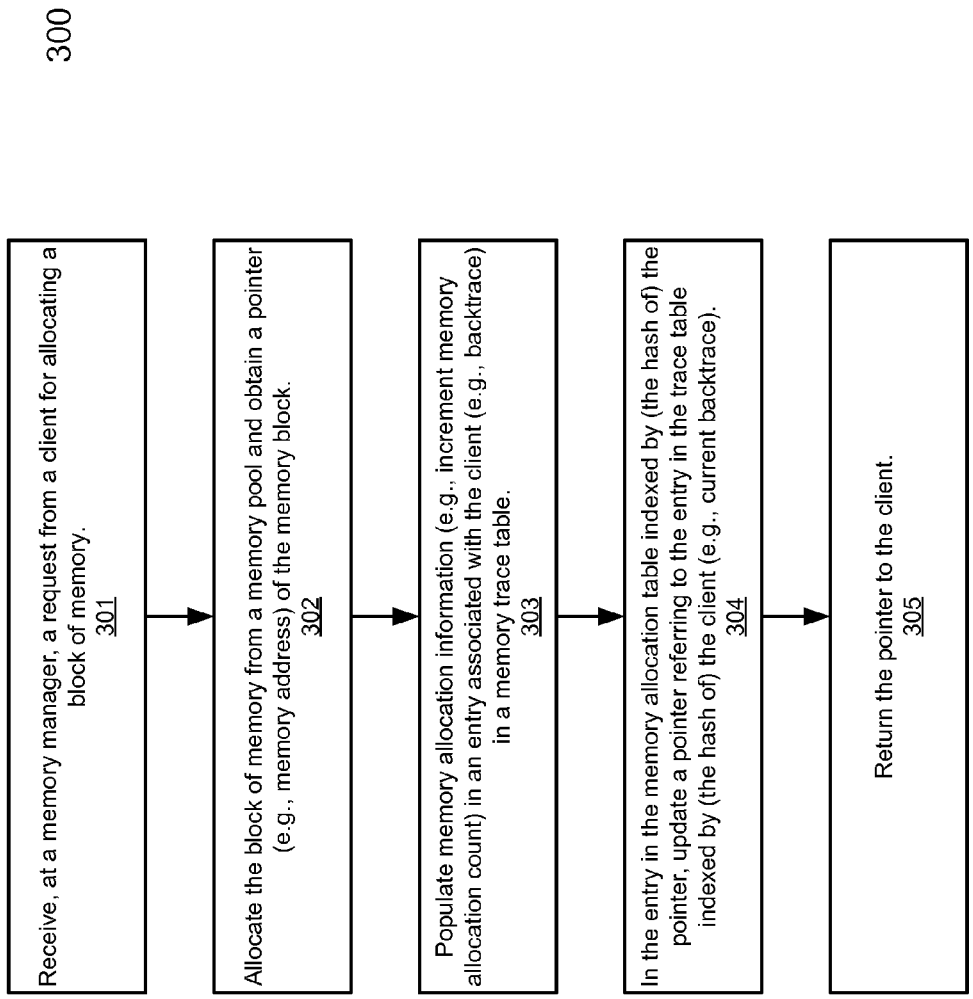
FIG. 3 is a flow diagram illustrating a method for allocating memory blocks according to one embodiment of the invention.

FIG. 3 is a flow diagram illustrating a method for allocating memory blocks according to one embodiment of the invention. For example, method 300 may be performed by memory manager 103 of FIG. 1. Referring to FIG. 3, at block 301, a memory manager receives a request for allocating a block of memory from a client. In response to the request, at block 302, memory manager allocates the requested memory block and obtains a handle (e.g., a starting memory address) to the allocated memory block. At block 303, the memory manager populates memory allocation information in the entry associated with the client in the trace table. In one embodiment, a memory allocation count of the trace entry is incremented. The client may be represented by a backtrace of a sequence of executable code or stack frames that requested the memory allocation. At block 304, the address of the trace entry is stored in the allocation entry corresponding to the handle of the memory allocation in the allocation table. Thereafter, the handle of the memory allocation is returned to the client at block 305 to complete the memory request process. FIG. 5 is pseudocode representing a program implementing method 300 of FIG. 3.

Figure 4:
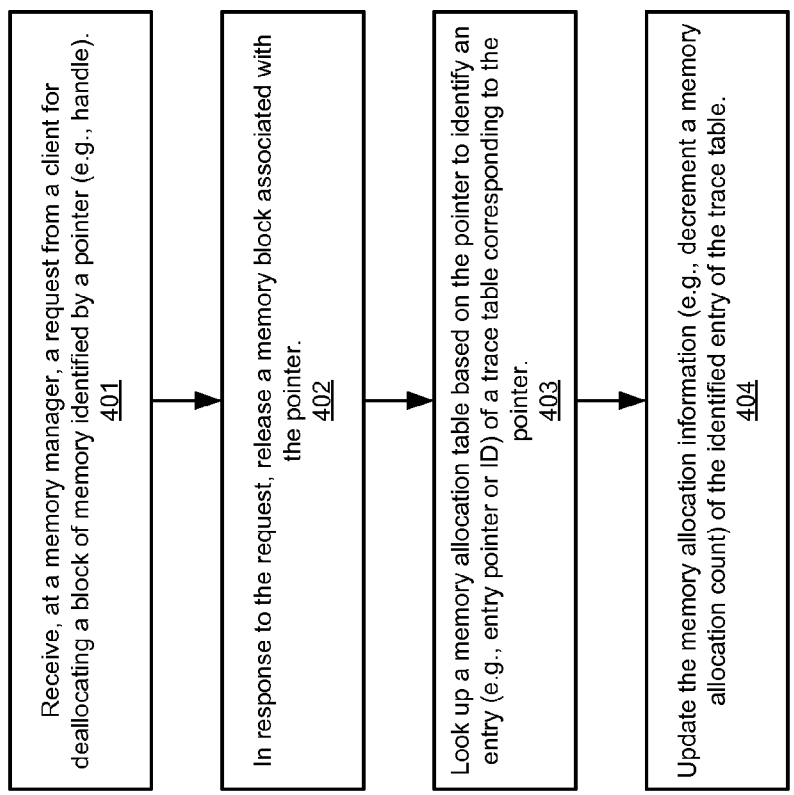
FIG. 4 is a flow diagram illustrating a method for deallocating memory blocks according to one embodiment of the invention.

FIG. 4 is a flow diagram illustrating a method for deallocating memory blocks according to one embodiment of the invention. For example, method 400 may be performed by memory manager 103 of FIG. 1. Referring to FIG. 4, at block 401, a memory manager receives a request from a client for deallocating a block of memory referenced by a handle. In response to the request, at block 402, the memory manager is configured to release the block of memory back to a memory pool. At block 403, the memory manager is to look up a memory allocation table to locate an allocation entry based on the handle and to identify a trace entry pointer of a trace table corresponding to the handle. Based on the trace entry pointer, at block 404, the memory manager is to update the memory allocation/deallocation information stored in a trace entry linked by the trace entry pointer, for example, including decrementing a memory allocation count of the trace entry. FIG. 6 is pseudocode representing a program implementing method 400 of FIG. 4.

The memory leak detection mechanism as described above may be implemented as part of an operating system or a plug-in or an extension of a kernel of an operating system. According to one embodiment, the memory leak detection mechanism may only be activated when there is a likelihood that someone is causing memory leaks. Initially according to one embodiment, the memory leak detection mechanism is inactive until the remaining memory available for allocation drops below a predetermined threshold. Typically, when a data processing system boots up, there are plenty of resources or memory available to be allocated to programs. Under such circumstances, there is no need to track memory leaks. When the available memory free for allocation drops below a predetermined threshold, according to one embodiment, the memory leak detection mechanism is activated. Often, a data processing system may have fewer memory leaks in which the available resources are sufficient enough to compensate the memory leaks without substantially impacting performance of the system. As a result, there may not be a need to detect the memory leak. Thus, the memory leak detection mechanism is activated only when it is needed to minimize resource consumption associated therewith.

As described above, when a request for allocating memory is received, such a memory allocation is recorded in the allocation table and trace table set forth above. In one embodiment, in response to a memory allocation request, an entry associated with a handle of the allocated memory is examined in the allocation table and an entry associated with an owner of the allocated memory is examined in the trace table. The memory allocation information such as a memory allocation count of the trace entries is updated accordingly. For a particular handle of an allocated memory block, if there is no corresponding entry or entries in the allocation table or the trace table, a new entry is allocated or created in the allocation table or the trace table, for example, by storing a trace entry pointer in an entry of the allocation table and incrementing a memory allocation count in the associated trace entry in the trace table.

Similarly, when a request for deallocating a memory block is received, the associated memory allocation count is decremented and the corresponding trace entry pointer in the associated allocation entry of the allocation table may be reset to a predetermined value such as a NULL or zero. If the memory allocation count of a particular trace entry reaches zero, it means that the particular trace entry is free to be allocated to someone else. Similarly, when the trace entry pointer of a particular allocation entry of the allocation table does not contain a valid trace entry pointer (e.g., NULL or zero), that particular allocation entry is free for allocation. According to one embodiment, in order to maintain a relatively small size of the allocation table and/or trace table and also to reproduce the CPU overhead associated with the bookkeeping, only samples of the memory allocation requests are recorded. For example, one out of N memory allocations may be recorded, which may be configurable based on a policy. In this way, although certain memory leak offenders may not be caught; however, frequent memory leak offenders will eventually be caught. This configuration can trap the major memory leak offenders while consuming less system resources or processing power for the memory leak detection.

In one embodiment, a client or owner of an allocated memory block may be represented by a backtrace of sequence of executable code (e.g., backtrace of stack frames) that requested the memory allocation and/or deallocation. Each of the entries in the allocation table is indexed based on a hash value of a handle of a memory allocation. Each of the entries in the trace table is indexed based on a hash value of a backtrace of a program that requested a memory allocation and/or memory deallocation. As a result, the memory manager can pinpoint based on the backtraces and their memory allocation counts which lines of executable code likely causes the memory leaks.

Referring back to FIGS. 1 and 2, the backtrace of any of programs 101-102 can be obtained by backtrace module 109 and provided to memory manager 103. Backtrace module 109 may be implemented as an extension of a kernel of an operating system that allows, via an API, memory manager to obtain a backtrace of stack frames of a current thread that requested a memory allocation or deallocation. An example of a backtrace is shown in FIG. 8, which can be reported by analysis module 110 as part of memory usage report 111 (e.g., memory leak report). Memory usage report 111 can be further analyzed dynamically or offline to identify which of the programs currently installed in system 100 causes most memory leaks.

Referring now to FIG. 2, allocation table 105 and trace table 106 may be implemented in a variety of forms such as arrays, data structures, data objects, or a combination thereof (e.g., a linked list of data structures). In one embodiment, allocation table 105 includes multiple entries that are indexed based on hash values of memory addresses associated with allocated memory blocks. For example, when a memory block is allocated, a handle of the memory block is obtained. An entry of allocation table 105 is identified based on a hash of the handle, where the hash can be generated using a variety of hash functions or algorithms such as Jenkins, FNV, SHA-1, or MD5 hash algorithms. That is, once the hash value of a handle is obtained, the hash value is utilized as an index in field 201 to locate an entry in allocation table 105. In one embodiment, each entry of allocation table 105 further includes field 202 to store the actual handle or memory address of the memory allocation and field 203 to store a pointer referencing a trace entry of trace table 106. Other information may also be stored in allocation table 105.

Similarly, according to one embodiment, trace table 106 includes multiple entries that are indexed based on a hash value of a backtrace representing a client or owner that requests the memory allocation or deallocation. For example, when a memory block is allocated for a client, a backtrace of the client is obtained from the operating system (e.g., via backtrace module 109). An entry of trace table 106 is identified based on a hash of the backtrace, where the hash can be generated using a variety of hash functions or algorithms such as Jenkins, FNV, SHA-1, or MD5 hash algorithms. That is, once the hash value of the backtrace is obtained, the hash value is utilized as an index to field 204 to locate an entry in trace table 106. In one embodiment, each entry of trace table 106 further includes field 205 to store memory allocation information associated with the entry, such as, for example, a memory allocation count. Each entry of trace table 106 further includes field 206 to store other information, such as the actual backtrace associated with the entry. Other information may also be stored in trace table 106.

As shown in FIG. 2, by using hashes of handles as indexes for allocation table 105 and hashes of backtraces as indexes for trace table 106, according to one embodiment, the sizes of allocation table 105 and trace table 106 can be maintained in a reasonable size. That is, each of allocation table 105 and trace table 106 includes a fixed number of entries or slots which are identified or located based on the hashes of handles and backtrace, respectively. However, hashes of different values (e.g., handles or backtraces) may yield the same hash value (e.g., hash collision). As a result, sometimes multiple entries of allocation table 105 such as entries 207-208 may reference to the same trace entry 209 of trace table 106. According to some embodiments, under certain circumstances, in order to limit the resource consumed by allocation table 105 and trace table 106, certain memory allocations may not be recorded in allocation table 105 and trace table 106. The system can only record memory allocations up to the total number of entries in allocation table 105 and trace table 106. In some situations, when a new memory allocation is recorded, an early recorded one that occupies the same slot may be evicted from or overridden in the table, dependent upon the circumstances. As described above, although some memory leak offenders may not be caught at a particular point in time; however, a frequent memory leak offender will eventually be caught.

Figure 7:
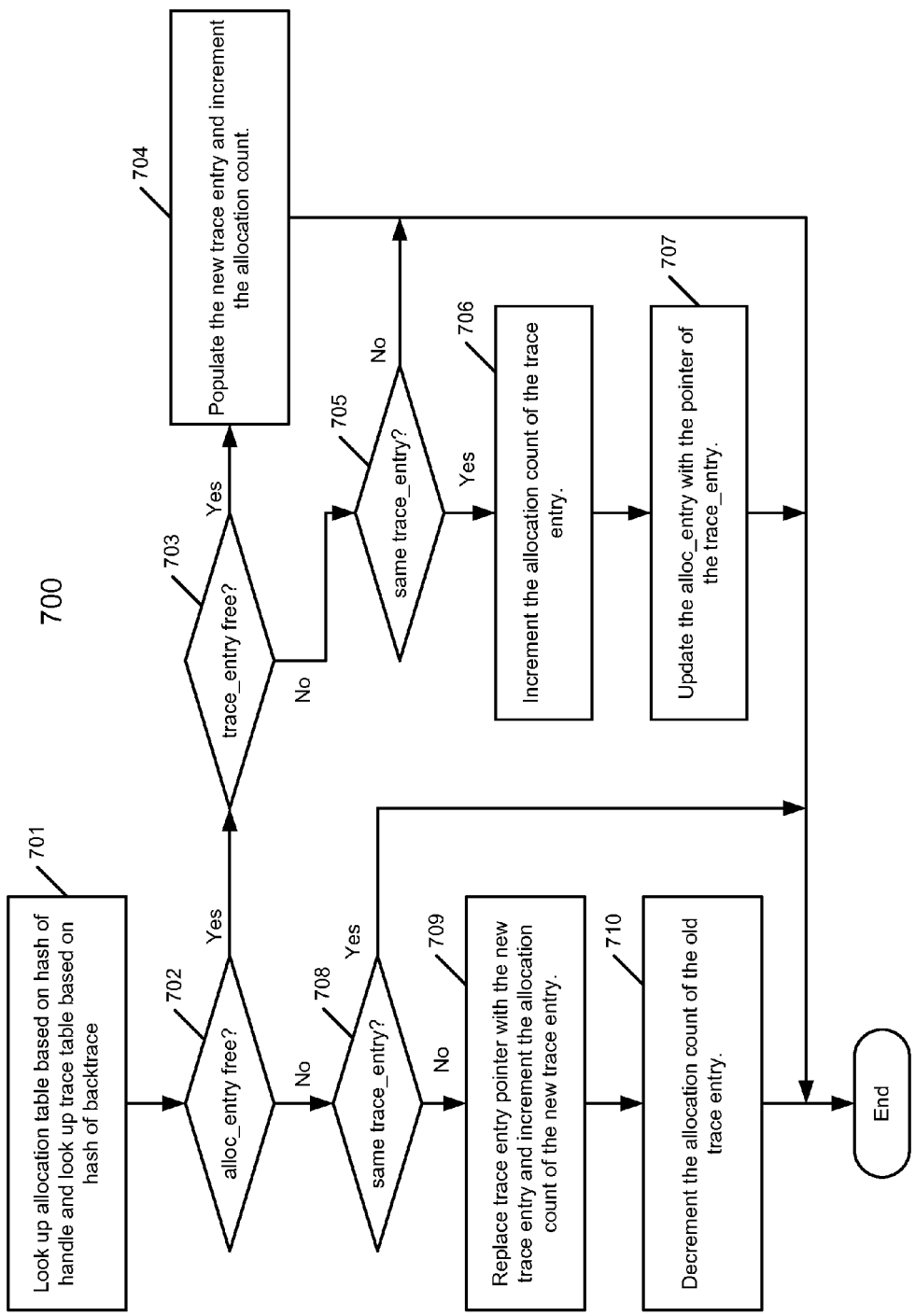
FIG. 7 is a flow diagram illustrating a method for allocating memory blocks according to another embodiment of the invention.

FIG. 7 is a flow diagram illustrating a method for allocating memory according to another embodiment of the invention. Method 700 may be performed by memory manager 103 of FIG. 1, which may be implemented as processing logic in software, hardware, or a combination thereof. Referring to FIGS. 2 and 7, in response to a memory allocation referenced by a handle, at block 701, processing logic obtains a hash of the handle and a hash of a backtrace of a program that requested the memory allocation, and looks up allocation table 105 and trace table 106. At block 702, processing logic is to determine whether an allocation entry of allocation table 105 is free to be allocated to a client represented by the backtrace. In one embodiment, processing logic looks up in field 201 of allocation table 105 using a hash of the handle as an index to locate an allocation entry. Processing logic is then to examine field 203 of the allocation entry to determine whether there is trace entry pointer stored therein. If there is no trace entry pointer stored therein, the allocation entry is considered free to use.

If it is determined that the allocation entry is free, at block 703, processing logic then looks up trace table 106 using a hash of the backtrace as an index in field 204 to locate a trace entry. Processing logic then examines field 205 of the trace entry to determine whether the trace entry is free. In one embodiment, if field 205 contains certain memory allocation information, in this example, a non-zero memory allocation count, the trace entry is occupied; otherwise, the trace entry is free. If it is determined the trace entry is free (e.g., the current memory allocation is a new memory allocation and recorded the first time), at block 704, processing logic is to populate the necessary information in both allocation table 105 and trace table 106. In one embodiment, processing logic stores the actual memory handle in field 202 of the allocation entry and stores a memory address of the associated trace entry in field 203 of the allocation entry in allocation table 105. In addition, processing logic further stores at least a portion of the actual backtrace in field 206 of the trace entry and increments a memory allocation count in field 205 of the trace entry in trace table 106. In one embodiment, in order to limit the size of trace table 106, only limited amount information of a backtrace (e.g., a predetermined number such as 15 of lines of code or stack frames) is stored in field 206 of a trace entry. By storing a memory address of a trace entry in field 203 of an allocation entry, the allocation entry is considered as occupied. Similarly, by storing a non-zero memory allocation count in field 205 of a trace entry, the trace entry becomes occupied.

According to one embodiment, if it is determined at block 703 that the trace entry is occupied (e.g., a non-zero memory allocation count), at block 705, processing logic is to determine whether the trace entry is associated with the same owner or client. In one embodiment, processing logic compares the actual backtrace of the current thread that requests the memory allocation with the backtrace that is currently stored in field 206 of the trace entry. If both backtraces are matched, the trace entry is owned by the same owner. If the trace entry is owned by the same owner, at block 706, the memory allocation count stored in field 205 of the trace entry is incremented. At block 707, the memory address of the trace entry is stored in field 203 of the allocation entry, which in turn indicates that the allocation entry is now occupied.

Note that at this point, there may be multiple allocation entries referencing to the same trace entry. For example, if the memory allocation count of a trace entry is two, there may be at least two allocation entries in allocation table 105 associated with the corresponding trace entry of trace table 106. That is, an owner may have allocated multiple memory blocks without releasing some of them. For example, referring to FIG. 2, it is assumed that an owner represented by a backtrace allocated a first memory block, which results in allocation entry 207 (based on a first handle) referencing to trace entry 209. Subsequently, the same owner (e.g., same backtrace) allocates a second memory block, which results in allocation entry 208 (based on a second handle) referencing to the same trace entry 209 (because of the same backtrace). As a result, both allocation entries 207-208 reference to the same trace entry 209 having a memory allocation count of two.

According to one embodiment, if it is determined at block 702 that the allocation entry is occupied, at block 708, processing logic examines a trace entry referenced by the allocation entry to determine whether the trace entry is owned by the same owner (by comparing the backtrace as set forth above). In addition, processing logic may further compares the actual handle with the one stored in field 202 of the allocation entry to determine whether the memory allocation is the same as the one already recorded. If it is the same owner or same handle, processing logic may skip processing the current memory allocation, since it has already been processed. If it is not the same owner, at block 709, a new trace entry is allocated to the new owner from trace table 106. In addition, the trace entry pointer in field 203 is replaced with the address of the new trace entry and the memory allocation count of the new trace entry is incremented. Note that the allocation entry is now linked to the new trace entry instead of the old trace entry. At block 710, the memory allocation count of the old trace entry in trace table 106 is decremented.

Figure 9:
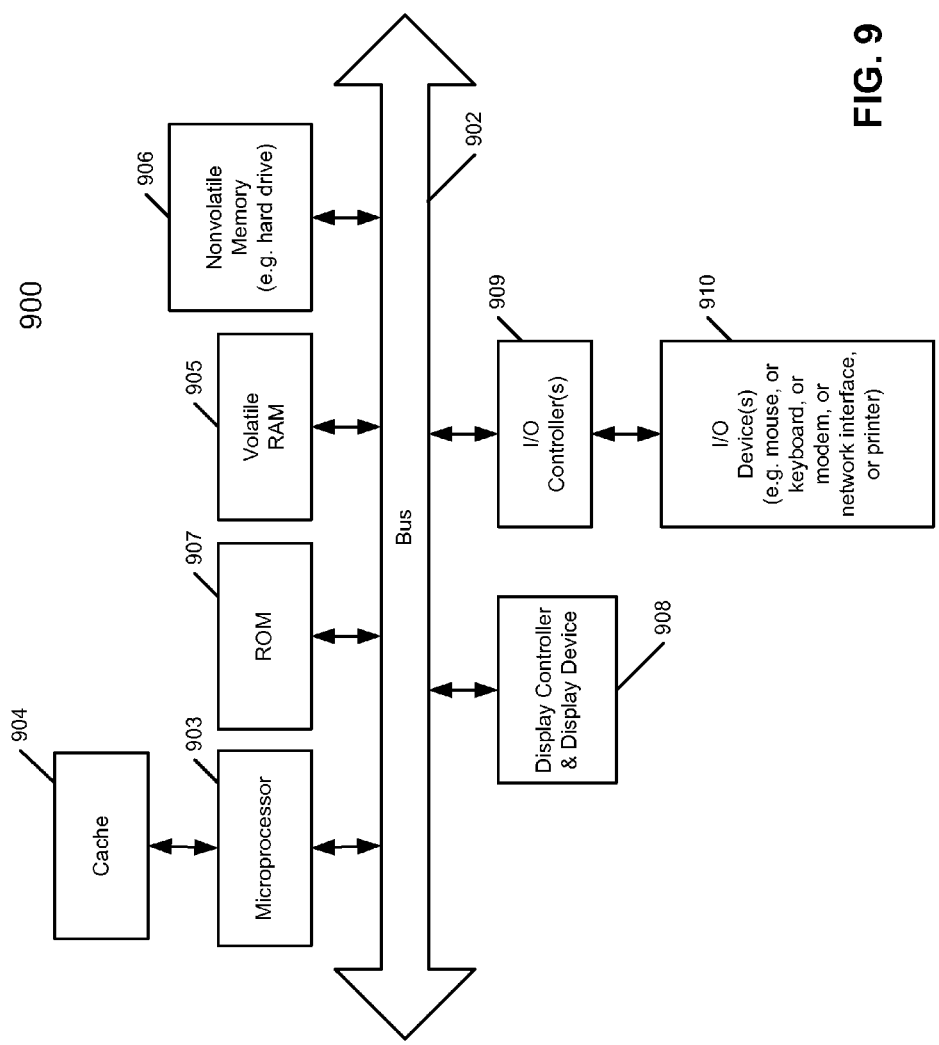
FIG. 9 is a block diagram of a data processing system, which may be used with one embodiment of the invention.

FIG. 9 is a block diagram of a data processing system, which may be used with one embodiment of the invention. For example, the system 900 may be used as part of system 100 as shown in FIG. 1. Note that while FIG. 9 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used with the present invention. The computer system of FIG. 9 may, for example, be an Apple Macintosh computer or MacBook, an IBM compatible PC, or a computer server.

As shown in FIG. 9, the computer system 900, which is a form of a data processing system, includes a bus or interconnect 902 which is coupled to one or more microprocessors 903 and a ROM 907, a volatile RAM 905, and a non-volatile memory 906. The microprocessor 903 is coupled to cache memory 904. The bus 902 interconnects these various components together and also interconnects these components 903, 907, 905, and 906 to a display controller and display device 908, as well as to input/output (I/O) devices 910, which may be mice, keyboards, modems, network interfaces, printers, and other devices which are well-known in the art.

Typically, the input/output devices 910 are coupled to the system through input/output controllers 909. The volatile RAM 905 is typically implemented as dynamic RAM (DRAM) which requires power continuously in order to refresh or maintain the data in the memory. The non-volatile memory 906 is typically a magnetic hard drive, a magnetic optical drive, an optical drive, or a DVD RAM or other type of memory system which maintains data even after power is removed from the system. Typically, the non-volatile memory will also be a random access memory, although this is not required.

While FIG. 9 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 902 may include one or more buses connected to each other through various bridges, controllers, and/or adapters, as is well-known in the art. In one embodiment, the I/O controller 909 includes a USB (Universal Serial Bus) adapter for controlling USB peripherals. Alternatively, I/O controller 909 may include an IEEE-1394 adapter, also known as FireWire adapter, for controlling FireWire devices.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for managing a memory in a computing system, comprising:
    generating a memory allocation table including a plurality of allocation entries, wherein each allocation entry includes a pointer to a memory block in the memory allocated to a respective software program and a pointer to a trace entry in a memory trace table;
    generating the memory trace table including a plurality of trace entries, wherein each trace entry includes memory allocation counts for the respective software program and trace information associated with the respective software program; and
    creating a list of software programs with the highest memory allocation counts dependent upon the memory trace table.

2. The method of claim 1, wherein creating the list of software programs with the highest memory allocation counts comprises identifying each software program via a backtrace of a sequence of executable code dependent upon the trace information included in a corresponding trace entry of the memory trace table.

3. The method of claim 1, further comprising generating a report of memory leak suspects dependent upon the list of software programs with the highest memory allocation counts.

4. The method of claim 3, further comprising sending the report of memory leak suspects to a user.

5. The method of claim 3, further comprising identifying which of the software programs causes the most memory leaks dependent upon the report of memory leak suspects.

6. The method of claim 1, further comprising updating the memory allocation table, wherein updating the memory allocation table comprises determining if a given allocation entry of the memory allocation table is free responsive to a determination that the given allocation entry includes a pointer to a respective entry in the memory trace table.

7. The method of claim 1, further comprising updating the memory trace table, wherein updating the memory trace table comprises determining if a given trace entry of the memory trace table is free responsive to a determination the memory allocation count for the given entry exceeds a predetermined threshold.

8. A non-transitory computer-accessible storage medium having instructions stored therein, which when executed by a processor, cause the processor to perform operations comprising:
generating a memory allocation table including a plurality of allocation entries, wherein each allocation entry includes a pointer to a memory block in a memory allocated to a respective software program and a pointer to a trace entry in a memory trace table;
generating the memory trace table including a plurality of trace entries, wherein each trace entry includes memory allocation counts for the respective software program and trace information associated with the respective software program; and
creating a list of software programs with the highest memory allocation counts dependent upon the memory trace table.

9. The non-transitory computer-accessible storage medium of claim 8, wherein to create a list of software programs with the highest memory allocation counts, the operations further comprise identifying each software program via a backtrace of a sequence of executable code using the trace information included in a corresponding trace entry of the memory trace table.

10. The non-transitory computer-accessible storage medium of claim 8, wherein the operations further comprise generating a report of memory leak suspects dependent upon the list of software programs with the highest memory allocation counts.

11. The non-transitory computer-accessible storage medium of claim 10, wherein the operations further comprise sending the report of memory leak suspects to a user.

12. The non-transitory computer-accessible storage medium of claim 10, wherein the operations further comprise identifying which software programs of the list of software programs cause the most memory leaks dependent upon the report of memory leak suspects.

13. The non-transitory computer-accessible storage medium of claim 12, wherein the operations further comprise identifying which lines of code within software programs of the list of software programs cause the most memory leaks dependent upon the report of memory leak suspects and the memory trace table.

14. A system, comprising:
a first memory configured to store data associated with each one of one or more software programs;
a second memory configured to store a memory allocation table and a memory trace table; and
a memory manager coupled to the first memory and the second memory, wherein the memory manager configured to:
generate the memory allocation table, wherein the memory allocation table includes a plurality of allocation entries, wherein each allocation entry includes a pointer to a memory block in the first memory allocated to a respective software program and a pointer to a trace entry in a memory trace table;
generate the memory trace table, wherein the memory trace table includes a plurality of trace entries, wherein each trace entry includes memory allocation counts for the respective software program and trace information associated with the respective software program; and
create a list of software programs with the highest memory allocation counts dependent upon the plurality of trace entries in the memory trace table.

15. The system of claim 14, wherein the memory manager is further configured to generate a report of memory leak suspects using the list of software programs with the highest memory allocation counts.

16. The system of claim 15, wherein the memory manager is further configured to send the report of memory leak suspects to a user.

17. The system of claim 15, wherein the memory manager is further configured to identify which of the software programs causes the most memory leaks dependent upon the report of memory leak suspects.

18. The system of claim 14, wherein the memory manager is further configured to update the memory allocation table, wherein to update the memory allocation table, the memory manager is further configured to determine if a given allocation entry of the memory allocation table is free responsive to a determination the given allocation entry includes a pointer to a respective entry in the memory trace table.

19. The system of claim 14, wherein the memory manager is further configured to update the memory trace table, wherein to update the memory trace table, the memory manager is further configured to determine if a given trace entry of the memory trace table is free responsive to a determination the memory allocation count for the given entry exceeds a predetermined threshold.

20. The system of claim 14, wherein the first memory and the second memory are the same memory.

* * * * *